United States Patent [19]
Fisher

[11] 3,935,840
[45] Feb. 3, 1976

[54] ROTARY ENGINE

[76] Inventor: John H. Fisher, 1422 Waterman Ave., San Bernardino, Calif. 40921

[22] Filed: Aug. 7, 1974

[21] Appl. No.: 495,410

[52] U.S. Cl................................ 123/8.23; 418/191
[51] Int. Cl.² ........................................ F02B 53/08
[58] Field of Search .......... 123/8.23, 8.41; 418/191, 418/196

[56] References Cited
UNITED STATES PATENTS

| | | | |
|---|---|---|---|
| 871,523 | 11/1907 | Pollock et al.................. | 123/8.23 X |
| 2,423,763 | 7/1947 | Fareso ................. | 123/8.23 |
| 2,447,608 | 8/1948 | Berry............................ | 123/8.23 X |
| 2,690,869 | 10/1954 | Brown.......................... | 418/191 UX |
| 3,366,096 | 1/1968 | Mathews........................... | 123/8.41 |
| 3,699,930 | 10/1972 | Bunce........................... | 123/8.41 |

FOREIGN PATENTS OR APPLICATIONS 625,277  9/1961  Italy.................... 123/8.23

Primary Examiner—Carlton R. Croyle
Assistant Examiner—Michael Koczo, Jr.
Attorney, Agent, or Firm—Dana E. Keech

[57] ABSTRACT

An engine unit operable independently or joined in multiples of two or more units for smoothing out the torque flow at slow speeds, each unit including a fuel-suction-compression assembly and a power generating assembly employing the same main shaft and separate valve shafts gear driven therefrom at a two-to-one ratio. Each assembly has a plate-like block bored out to provide a central cylinder chamber and two planetary cylindrical valve chambers. Fixed on the main shaft and rotating in said central chambers are two like rotors having cylindrical hubs and two arcuate segmental pistons extending diametrically therefrom to make smooth sealing rotational engagement with the walls of said central chambers. Fixed on said valve shafts are arcuate segmental valves making smooth sealing rotational engagement with said valve chambers and said rotor hubs. Two pockets at vertically superimposed positions in the power block concurrently receive fuel charges from the compression assembly and are ignited to produce duplicate balanced power strokes simultaneously. This happens twice during each revolution of the main shaft, thus giving four power strokes per revolution.

3 Claims, 15 Drawing Figures

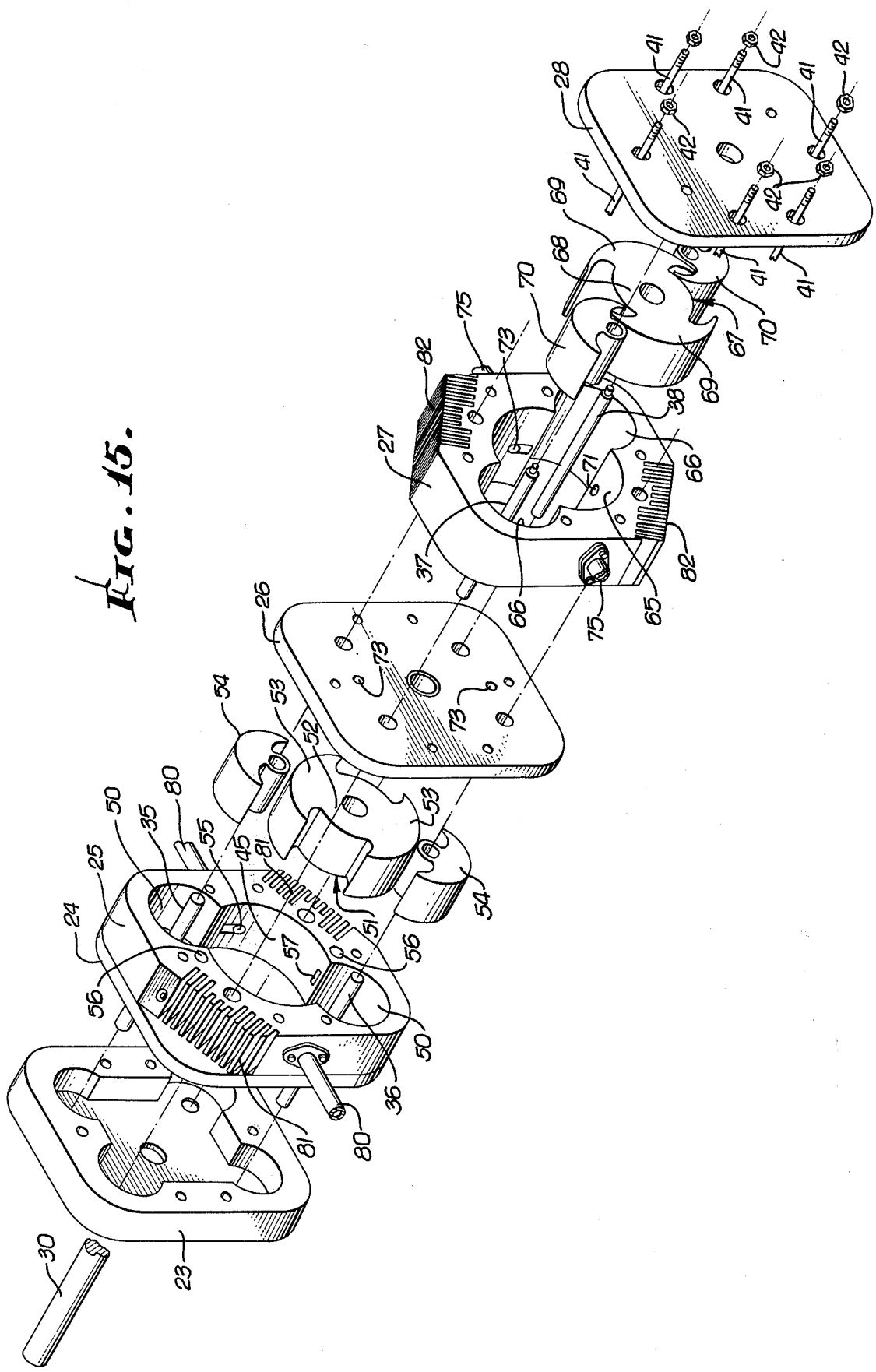

ROTARY ENGINE

SUMMARY OF THE INVENTION

Included among the objects of the present invention are the following goals:

To produce a balanced smooth running rotary engine having few parts and therefore relatively free from disorder.

To provide such an engine which will efficiently produce a smooth flow of power while being economical in its comsumption of fuel.

To provide a rotary engine having a relatively low weight per horse power.

To provide such an engine which is free of the sealing problems which still harrass the Wankel rotary notwithstanding its phenomenal success in the Japanese Mazda automobile.

It is to be noted that FIGS. 4, 6, 8 and 10 illustrate the parts of the fuel-suction-compression assembly at successive points in their operation which concur in time with those points in the operation of the power assembly illustrated respectively in FIGS. 3, 5, 7 and 9.

Figure 7:
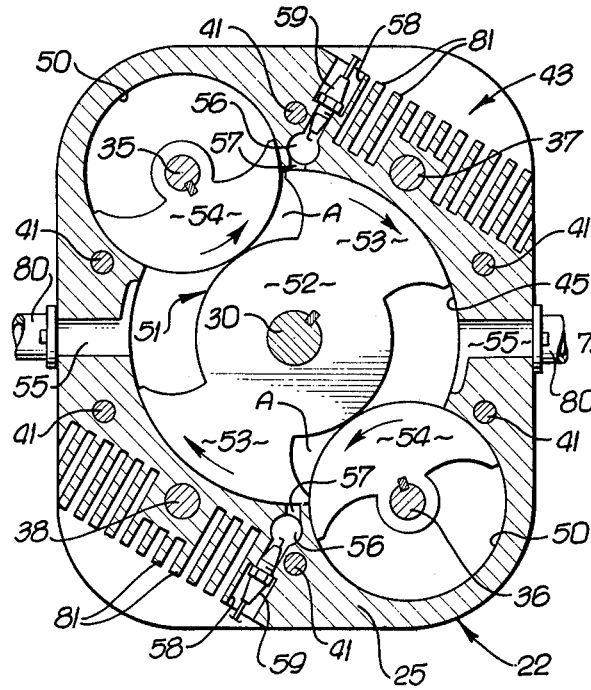
FIG. 7 is a view similar to FIG. 5 showing the parts of the power assembly advanced to a point where the double exhaust stroke shown as starting in FIG. 3 is nearing its completion while a double power stroke is just beginning.
Figure 9:
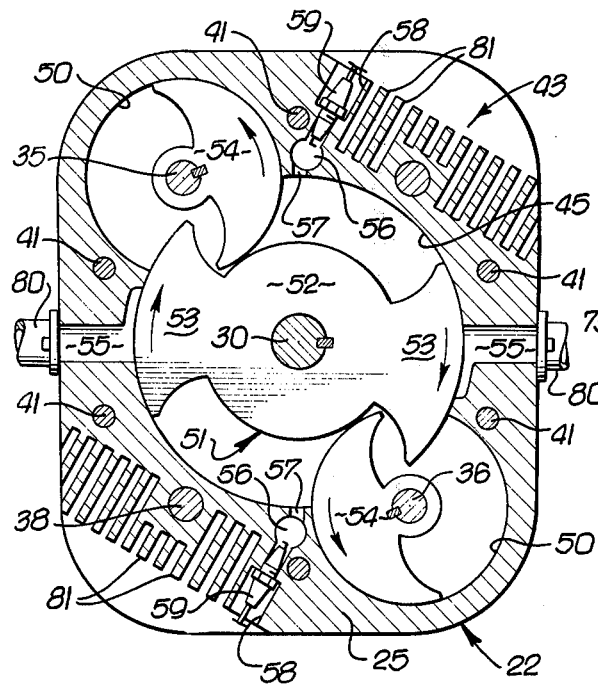

These pairs of views (3 and 4, 5 and 6, 7 and 8 and 9 and 10) thus illustrate the coordination between the operation of the fuel-suction-compression assembly ingesting and compressing double charges of fuel so as to complete this function at the appointed time when the power assembly is ready to receive these charges and convert these into double power strokes as shown in FIGS. 7 and 9.

FIG. 9 shows the rotor of the power assembly responding to the torque applied thereto by the double power stroke there shown as midway in its application of torque to said rotor and with the pistons of said rotor sealing off the exhaust ports until said power stroke is completed.

Figure 8:
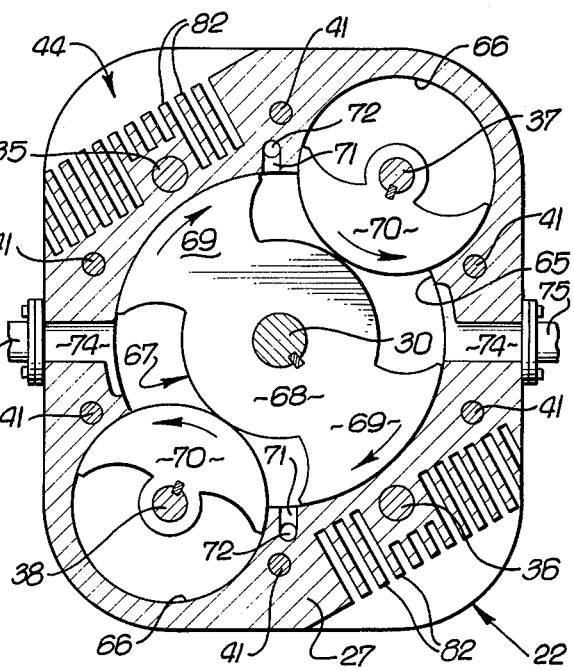
FIG. 8 is a view similar to FIG. 6 showing the parts of the fuel-suction-compression assembly advanced to a point where the double suction stroke shown as beginning in FIG. 6 is about midway advanced while the double compression stroke, shown in FIG. 6 as approaching its peak, has almost reached its peak.
Figure 10:
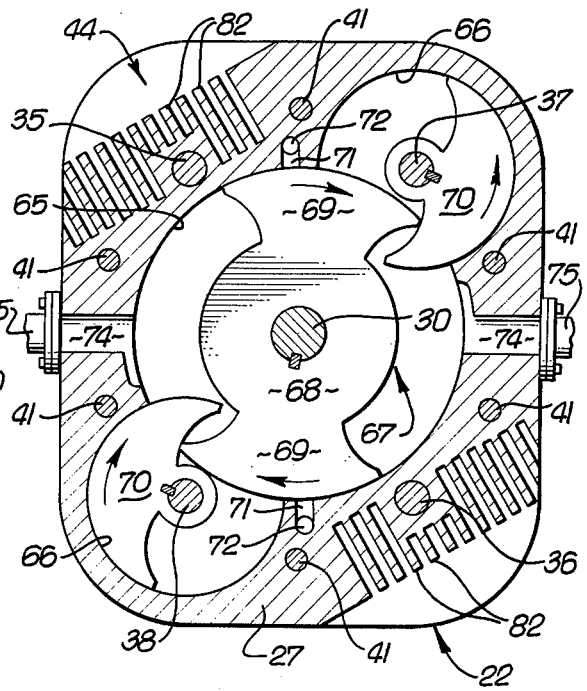

FIG. 10 shows the corresponding point in the operation of the parts of the fuel-suction-compression assembly and illustrates the approximate ending of a double suction stroke which was shown as beginning in FIG. 8. At the same time, this view shows how throughout the double power stroke shown as in progress in the power assembly in FIG. 9, the pistons of the compression assembly rotor continue to be located in sealing relation with the compressed fuel delivery passages provided in said assembly so as to prevent any possibility of back-firing during the aforesaid double power stroke in progress within the power assembly.

Figure 1:
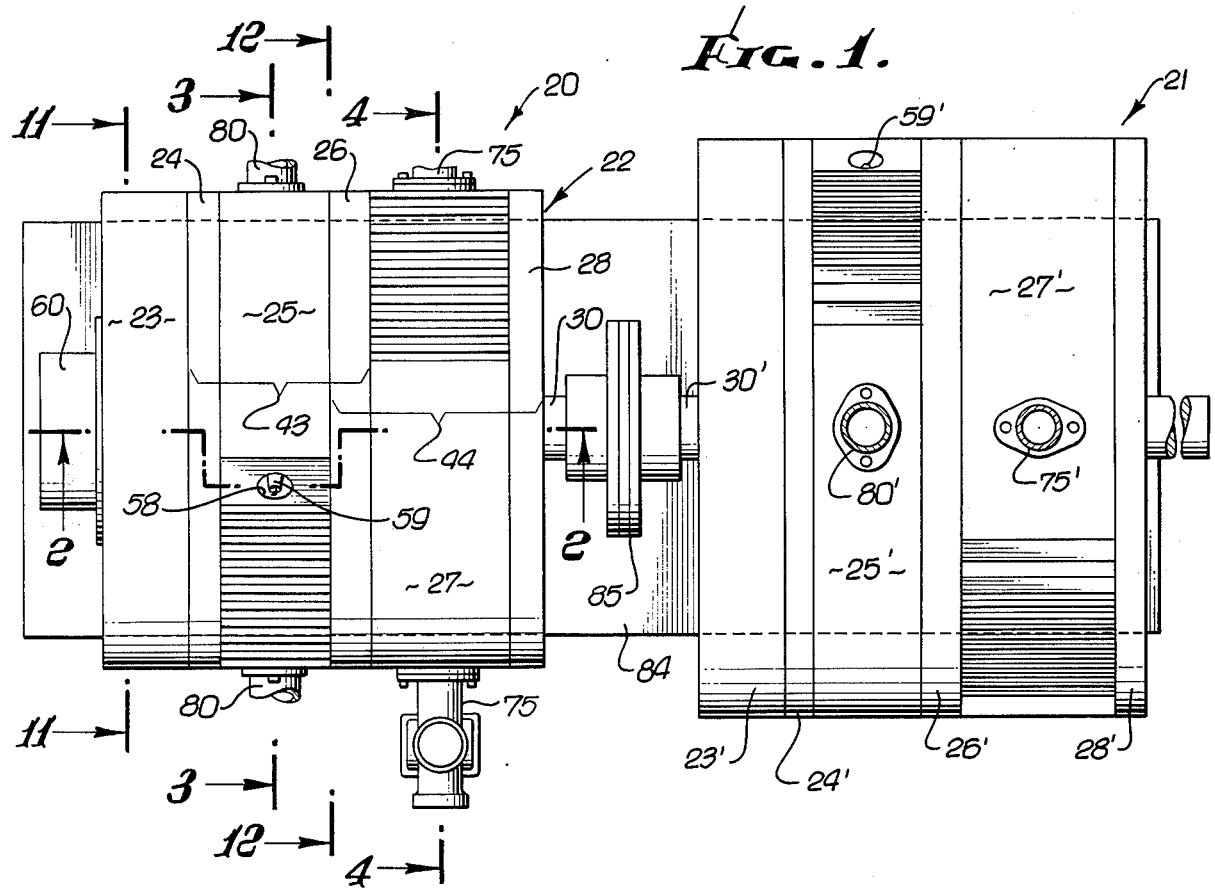
FIG. 1 is a plan view of a multiple unit embodiment of the present invention.
Figure 11:
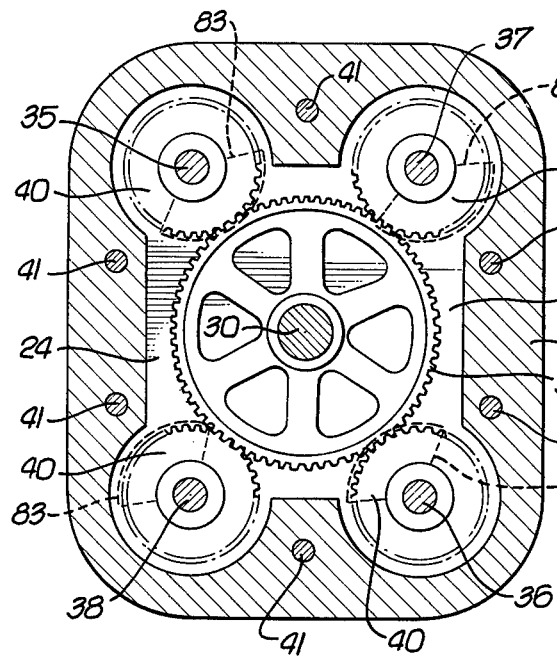

FIG. 11 is a vertical sectional view taken on the line 11—11 of FIG. 1 and illustrates the gear train by which rotation of the main shaft of the engine drives four cam shafts of the engine at a two-to-one ratio with said main shaft. This view also illustrates the provision on the smaller gears of said gear system of counterweights which counterbalance the eccentric dispositions of the centers of gravity of the valves in the engine.

Figure 12:
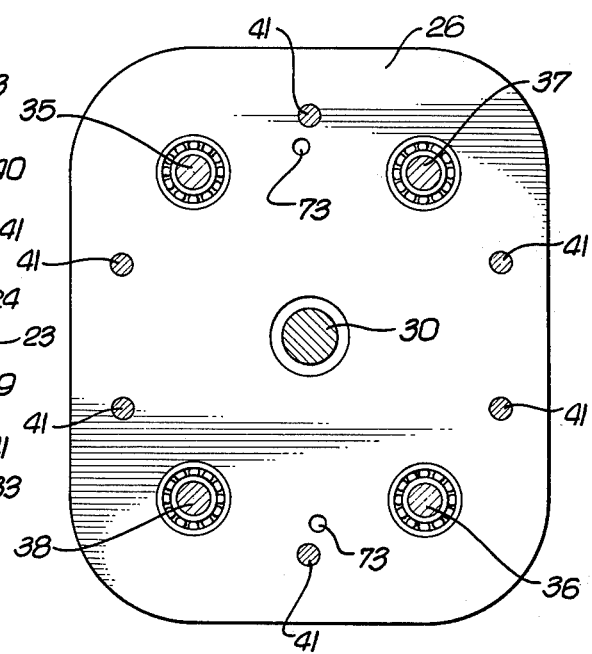

FIG. 12 is a vertical sectional view taken on the line 12—12 of FIG. 1 and illustrates the intermediate plate of the engine which is located between the power block and fuel-suction-compression assembly block of the engine and which is provided with passages for conveying compressed fuel from the fuel assembly of the engine to the power assembly thereof.

Figure 13:
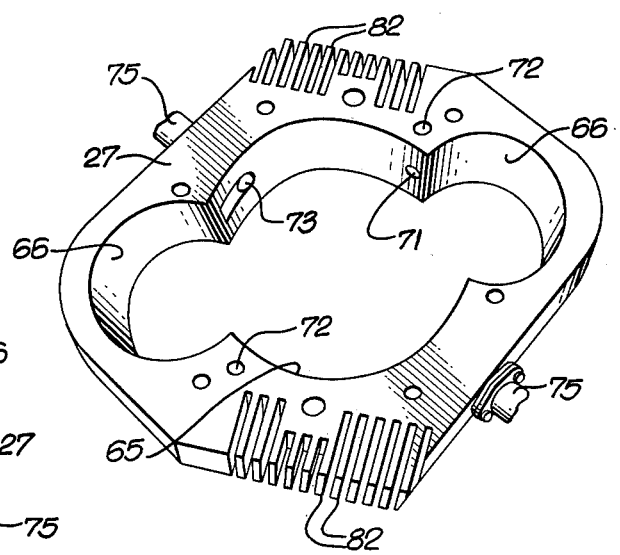

FIG. 13 is a perspective view of the fuel-suction-compression block of the engine showing the fuel intake ports connecting the carburetors with the central cylindrical bore of said block and the compressed fuel delivery passages leading from said central bore to an end of said block which contacts said intermediate plate and connects with passages in the latter delivering compressed fuel to duplicate ignition bores provided in said power block.

Figure 14:
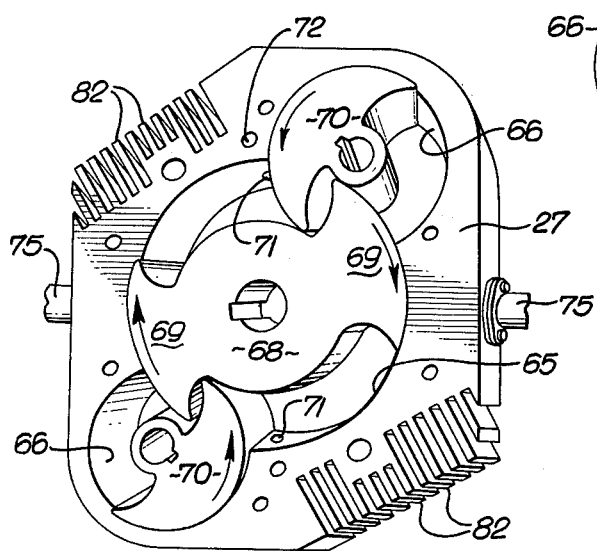

FIG. 14 is a perspective view of the fuel-suction-compression block with the compression assembly rotor and valves set in place to illustrate the operation of said assembly in accomplishing double compression strokes in which fuel is compressed for delivery as aforestated to said power assembly.

FIG. 15 is an exploded assembly view illustrating the principal parts of the engine of the invention spaced apart as in the process of assemblying these with said parts properly aligned with each other.

DESCRIPTION OF THE PREFERRED EMBODIMENT

The invention is comprised in a rotary engine 20 which is a complete power unit in itself although as previously pointed out, it may be advantageously employed in multiples of itself. For illustrative purposes, therefore, engine 20 is shown as axially connected with a rotary engine 21 which is a duplicate of rotary engine 20 except for slight differences which will be pointed out after specifically describing the preferred embodiment of the invention incorporated in rotary engine 20.

The engine 20 has a composite body 22 including a front gear cover plate 23, a front bearing plate 24, a power cylinder block 25, an intermediate bearing plate 26, a fuel cylinder block 27 and a back bearing plate 28. Journalling in ball bearings 29 provided in plates 24, 26 and 28 is main shaft 30. A pair of valve shafts 35 and 36 and another pair of valve shafts 37 and 38 extend axially through body 22 and journal in suitable bearings provided in plates 24, 26 and 28. Said valve shafts are spaced upwardly and downwardly from shaft 30 and are parallel with and equidistant from said main shaft, shafts 35 and 36 lying in a common plane with main shaft 30 which is inclined approximately 35° leftward from vertical and shafts 37 and 38 lying in a common plane with main shaft 30 which is inclined approximately 35° to the right.

Fixed on the front end of main shaft 30 is a master gear 39 which meshes with smaller gears 40 fixed on the front ends of valve shafts 35, 36, 37 and 38 so that rotation of shaft 30 drives said valve shafts in a two-to-one ratio. The various elements of composite body 22 above described are united by six rods 41, for the accommodation of which six holes parallel with main shaft 30 are provided, said rods extending through body 22 and receiving nuts 42 at their opposite ends.

Referring now to FIGS. 3 to 10 inclusive, it is to be noted that the engine 20 embraces two assemblies, the first of which will be referred to as power assembly 43 which includes front bearing plate 24, power cylinder block 25, intermediate bearing plate 26 and the operating elements associated therewith. The second assembly will be referred to as fuel-suction-compression assembly 44 which embraces intermediate bearing plate 26, fuel cylinder block 27 and back bearing plate 28 and the operative elements associated therewith and presently to be described.

POWER ASSEMBLY 43

Bored centrally from power cylinder block 25 is a power cylinder chamber 45 which is concentric with main shaft 30 while planetary power valve cylindrical chambers 50 are bored in block 25 which are concentric with valve shafts 35 and 36 and intercept power cylinder chamber 45 as clearly shown in FIGS. 3, 5, 7 and 9.

Fixed on shaft 30 and rotatable within power cylinder chamber 45 is a power rotor 51 comprising a cylindrical hub 52 which has approximately the same radius as planetary valve chambers 50 and is provided with diametrically opposite arcuate peripheral pistons 53 which conform to and make a sliding sealing fit with power cylinder chamber 45 permitting said rotor to freely rotate within said chamber.

Fixed on valve shafts 35 and 36 in valve chambers 50 are segmental planetary valves 54 which preferably subtend arcs of approximately 180°. The leading and following faces of pistons 53 and valves 54 are concave so as to facilitate the cooperative operation of said pistons and valves in the performance of the power assembly 43. Formed radially in power cylinder block 25 at diametrically opposite points therein are exhaust ports 55. Formed axially in said block in diametrically opposite relation within angles formed between chamber 45 and valve chambers 50 are two ignition chamber bores 56 which communicate through passages 57 with power cylinder chamber 45. Spark plug receptacle holes 58 are bored radially from upper and lower edges of block 25 into communication with ignition chamber bores 56 so that spark plugs 59 screwed into holes 58 project into bores 56 so that said plugs when energized will ignite fuel charges which have been delivered under high pressure into said bores. The engine 20 is of course provided with a suitable source of electricity (not shown) which is distributed by a distributor 60 mounted on the front end of gear cover plate 23 and rotatably adjustable for the purpose of advancing or retarding the timing of the sparks produced by plugs 59.

FUEL-SUCTION-COMPRESSION ASSEMBLY 44

For convenience, this assembly will be referred to hereinafter as the "compression assembly 44" and reference is made to FIGS. 4, 6, 8 and 10 in describing the same.

It is to be noted that block 27 of this assembly is substantially thicker than the power block 25 of power assembly 43. The reason for this will be made clear in the description of the operation. The block 27 has the same outline as power block 25 but is turned 180° about a vertical axis to accommodate this block to the peculiarities of the compression assembly being described. The fuel cylinder block 27 has a central bore comprising a compression cylinder chamber 65 which is concentric with the main shaft 30. Smaller bores 66 concentric with the valve shafts 37 and 38 are formed in block 27 which bores intercept the cylinder chamber 65 and constitute planetary valve chambers for the compression assembly 44. Fixed on shaft 30 within cylinder chamber 65 for free rotation therein is a compression rotor 67 which includes a cylindrical hub 68 which preferably has the same radius as the planetary valve chambers 66 and is provided, at diametrically opposite points, with arcuate pistons 69, the peripheries of which make a sliding sealing fit with compression cylinder chamber 65. Fixed on valve shafts 37 and 38 are segmental planetary valves 70 which preferably subtend an angle of about 180° and make a smooth sealing sliding fit with planetary valve chambers 66. Leading and trailing faces of pistons 69 and planetary valves 70 are concave so as to facilitate the interfitting of end portions of said valves and pistons during the operation of compression assembly 44.

In diametrically opposed areas of the fuel cylinder block 27 corresponding to areas in the power block 25 in which ignition chamber bores 56 are provided, the fuel cylinder block 27 has formed radially therein compressed fuel ports 71 which communicate through axial passages 72 in block 27 with holes 73 formed axially in intermediate bearing plate 26, said holes 73 being aligned and directly communicating with the ignition chamber bores 56 of the power assembly 43.

At diametrically opposite points in the compression cylinder chamber 65, fuel cylinder block 27 is provided with fuel intake ports 74 which communicate with carburetors 75 mounted on the side faces of said block.

At diametrically opposite points, the power cylinder block 25 is provided with exhaust pipes 80 which communicate with and receive exhaust gases from exhaust ports 55 formed in said block.

Power block 25 and fuel compression block 27 are each milled away at a diagonally opposite pair of corners to provide suitable groups of cooling fins 81 and 82 respectively.

The gears 40 mounted on cam shafts 35, 36, 37 and 38 are optionally provided with counterweights 83 which supplement the tendency of segmental valves 54 and 70 to counter balance each other so that there is a minimum of vibration produced by the eccentricity of the centers of gravity of said valves.

Figure 2:
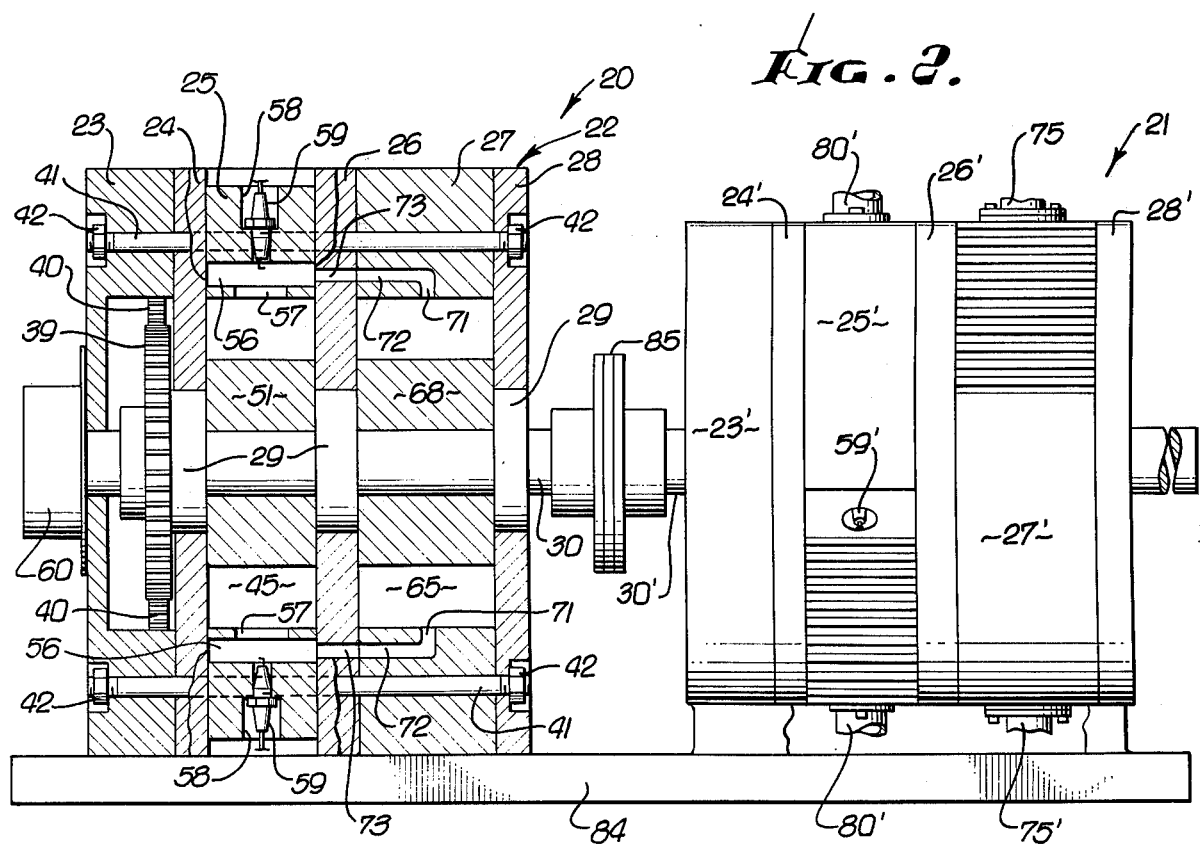
FIG. 2 is a side elevational view of FIG. 1 partly taken in section on the line 2—2.

As before stated, engine 21 shown in FIGS. 1 and 2 is a substantial duplicate of engine 20 as described hereinabove and the parts of engine 21 which are exact counter parts of corresponding parts in engine 20 will be designated in the drawings by use of the same reference numerals applied to said corresponding parts of engine 20 with prime attached. The two engines are shown in FIGS. 1 and 2 as mounted on a common base 84 and with the main shaft 30 of engine 20 and shaft 30' of engine 21 co-axially connected by a flexible coupling 85. The engine 21 as shown in the drawings is not provided with a separate distributor for supplying the spark plugs 59' thereof with electricity as the co-axial coupling of the two engines permits this function for engine 21 to be readily performed by distributor 60 of the engine 20.

It is to be noted however, that engine 21 is disposed at an angle of 90° with reference to engine 20 so that the power strokes generated by these two engines will not coincide but be spaced circumferentially from each other so as to smooth the torque flow produced by the two engines thus joined together.

OPERATION

It is to be noted that all the operational views of the drawings, to wit: FIGS. 3 to 14 inclusive are taken from the point of view of a person facing the engine from the left or front end thereof. Pairs of FIGS. 3 and 4, 5 and 6, 7 and 8, and 9 and 10, illustrate corresponding phases in the operation of the power assembly 43 and the compression assembly 44 of the engine 20 and the two views in each of these pairs of figures are taken at exactly the same point of time in the operation of said engine.

Figure 3:
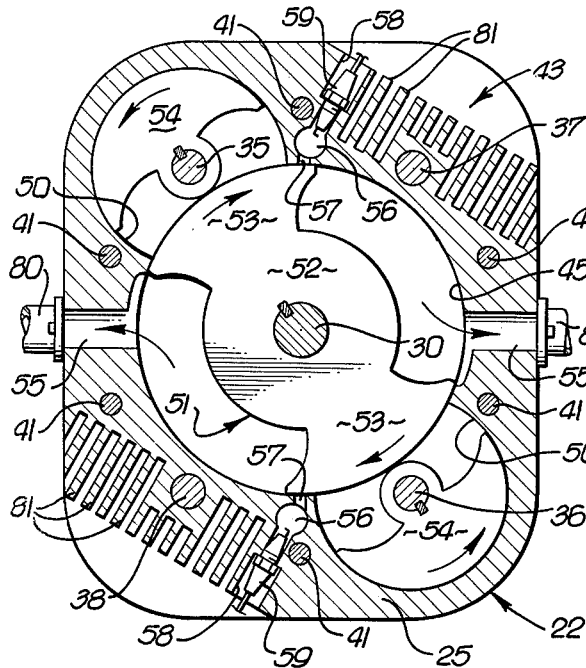
FIG. 3 is a sectional view taken on the line 3—3 of FIG. 1 showing the power assembly of the engine of the invention with the parts disposed as at the start of an exhaust stroke of said assembly.
Figure 4:
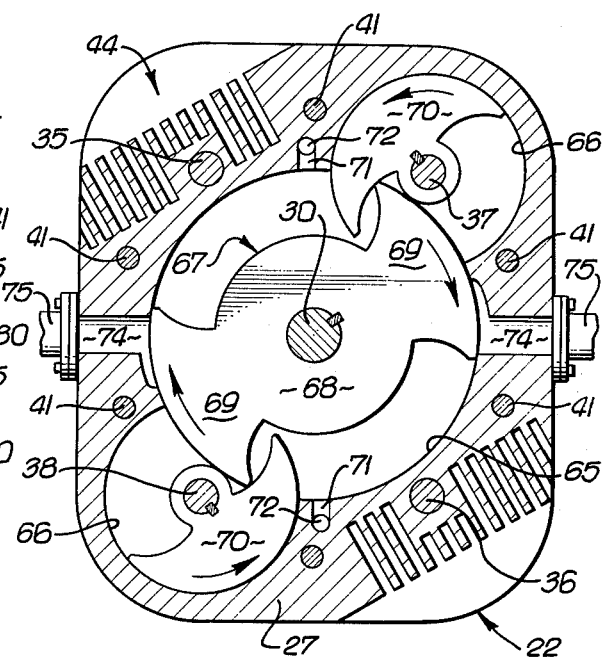
FIG. 4 is a vertical sectional view taken on the line 4—4 of FIG. 1 and illustrating the fuel-suction-compression assembly of the engine of the invention with the parts thereof disposed as at the beginning of a double compression stroke by said assembly which concurs with the parts in the power assembly being in the positions shown in FIG. 3.

Thus, FIGS. 3 and 4 show power assembly 43 well started with a double exhaust phase of this assembly while the compression assembly 44 is well started with a double compression phase of that assembly.

Figure 5:
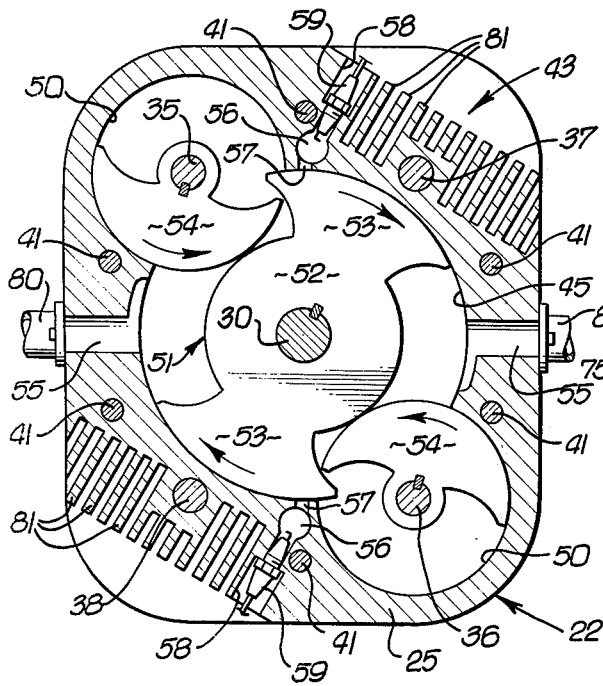
FIG. 5 is a view similar to FIG. 3 showing the rotor of the power assembly advanced approximately 60° and the rotary valves of the power assembly advanced approximately 120° to place the power assembly in the middle of a double exhaust stroke.
Figure 6:
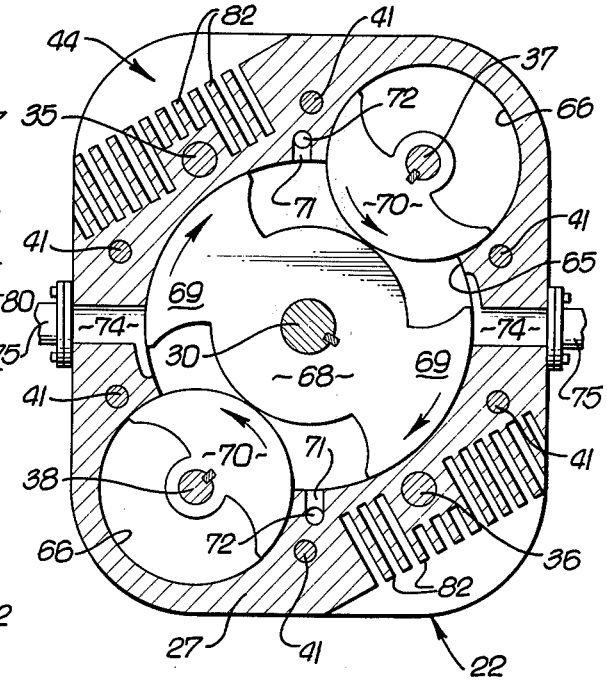
FIG. 6 is a view similar to FIG. 4 showing the rotor of the fuel-suction-compression assembly advanced approximately 60° from the position in which it is shown in FIG. 4 and with the rotary valves associated with said rotor advanced approximately 120° from the positions these are shown in FIG. 4 and bringing said assembly to a point in its operation wherein a double suction stroke is beginning and a double compression stroke is approaching its peak.

Pair of FIGS. 5 and 6 illustrate a point in the operation of engine 20 in which the rotors 51 and 67 of assemblies 43 and 44 are advanced 60° from their respective positions shown in FIGS. 3 and 4 and the respective segmental valves 54 and 70 of said two assemblies have advanced 120° from the positions in which they are shown in FIGS. 3 and 4. We thus have in FIGS. 5 and 6 the pictorial story of an advanced phase in the operation of engine 20 in which the exhaust function (shown as well started in FIG. 3) is shown in FIG. 5 as when nearing completion. It is also to be noted that throughout the rotation through angles of 60° of the engine rotors, leading to the rotors being positioned as shown in FIGS. 5 and 6, the power rotor 51 has sealed off ports 57 through which ignition chamber bores 56 communicate with power cylinder 45. During this 60° rotation of shaft 30 of engine 20 leading up to the positions of the engine parts shown in FIGS. 5 and 6, the compression assembly 44 has substantially advanced the double compression stroke shown at the beginning in FIG. 4 the fuel thus compressed by the rotor 67 being forced through ports 71, axial passages 72 and the holes 73 provided in intermediate plate 26 into ignition bores 56 formed axially in power block 25. FIG. 2 clearly illustrates how these various passages directly link up the respective compression chambers produced by rotor 67 in the compression cylinder 65 of assembly 44 with the compressed fuel ignition bores 56 provided at diametrically opposite points in power block 25.

FIGS. 7 and 8 illustrate the assemblies 43 and 44 with the rotors thereof turned only a few degrees clockwise from the positions in which said rotors are shown in FIGS. 5 and 6 so as to illustrate how late the passages 57 are closed by the rotor pistons 53 of power rotor 51 while the fuel compression steps being concurrently accomplished in compression assembly 44 are reaching their final stages of compressing and delivering fuel through the ports 71, passages 72 and holes 73 into the compressed fuel ignition bores 56. As the power rotor 51 continues to rotate from the position in which it is shown in FIG. 7, the rotor 67 in the compression assembly 44 advances so as to cover both of the compressed fuel delivery ports 71 formed in the compression cylinder chamber 65 at the instant the spark plugs 59 are energized to ignite the compressed fuel charges confined in the ignition bores 56. This occurs just as the passages 57 connecting the fuel charge ignition bores 56 to the power assembly cylindrical chamber 45 are uncovered by power rotor 51. With the segmental valves 54 confining small areas A in said chamber into which the passages 57 open, the gases of combustion thus produced are blasted through the passages 57 into said relatively small confined areas A and produce a double power stroke by the expansion of these gases of combustion respectively against the pistons 53 of the rotor 51.

FIGS. 9 and 10 illustrate the power assembly 43 in the middle of a double power stroke and the compression assembly 44 well advanced in a double suction stroke in which two charges of gaseous fuel have been sucked into chambers created by the correlative rotation of the rotor 67 and the segmental valves 70 as shown in FIG. 10. It is to be noted that the radial passages 71 in the cylinder chamber 65 of the compression assembly 44 still remain closed by the pistons 69 of the rotor 67 and that this continues throughout the double power stroke shown about three-quarters completed in FIG. 9.

For the next phase in the operation of engine 20 following FIGS. 9 and 10, we return to FIGS. 3 and 4 where we see a double exhaust stroke in the power assembly 43 being well started thus concluding the power stroke and the automatic covering and sealing off of the passages 57 by the pistons 53 of the rotor 51 and the beginning, in the compression assembly 44 of a double fuel vapor compression stroke, thereby concluding a complete cycle of operation of the engine 20.

I claim:

1. A rotary internal combustion engine comprising:
    a power block;
    a fuel-suction-compression block;
    an intermediate plate covering juxtaposed faces of said blocks;
    a front end plate covering the front face of said power block;
    a rear end plate covering the rear face of said compression block;
    a power shaft normal to and extending centrally through said plates and blocks;
    four valve shafts parallel with and equally spaced from said power shaft and including two power valve shafts lying in a common plane with said power shaft and two compression valve shafts lying in a different common plane with said power shaft, said common planes being symmetric with a vertical plane containing the axis of said power shaft;

bearing means provided in said plates in which said shafts journal, there being a power cylinder chamber formed in said power block and a compression cylinder chamber formed in said compression block, both chambers being co-axial with said power shaft, there being exhaust ports at diametrically opposite points in the wall of said power cylinder chamber;

there being fuel inlet ports at diametrically opposite points in the wall of said compression cylinder chamber, there being formed in said power block two cylindrical valve chambers concentric respectively with said power valve shafts and intercepting and communicating with said power cylinder chamber, there being formed in said compression block two cylindrical valve chambers concentric with said compression valve shafts and intercepting and communicating with said compression cylinder chamber;

carburetor means for supplying fuel to said intake ports;

a power rotor fixed on said power shaft and having a cylindrical hub from which two arcuate pistons extend diametrically into rotational sealing relation with the wall of said power cylinder chamber;

a compression rotor fixed on said power shaft and having a cylindrical hub from which two arcuate pistons extend diametrically into rotational sealing relation with the wall of said compression cylinder chamber;

four segmental valves one of which is fixed on each of said valve shafts to make a peripheral sliding sealing contact with said cylindrical valve chambers and with the hubs of said power rotor and compressor rotor respectively;

a gear train mounted on said shafts whereby said power shaft drives said valve shafts at a 2 to 1 ratio, with said valves cooperating with said pistons to form duplicate fuel suction and compression zones in said compression chamber on opposite sides of said compression rotor and duplicate expansion and exhaust zones in said power chamber on opposite sides of said power rotor;

there being two fuel charge firing bores provided in said power block close to and communicating with diametrically opposed points in said power cylinder chamber which are close to where said power cylinder chamber is intercepted by said valve cylinder chamber;

there being passage means formed in said intermediate plate and in said compressor block leading from each of said fuel compression zones on opposite sides of said compressor rotor to one of said two fuel firing bores to simultaneously deliver charges of compressed fuel to said bores; and an ignition system driven by said shaft for the timely ignition of said charges of fuel in said bores to produce duplicate simultaneous power strokes by the emission of combustion gases from said bores into said duplicate expansion and exhaust zones as the generation of said zones is being initiated by the rotation of said shafts.

2. An engine as recited in claim 1 wherein said planes containing the respective axes of said two pairs of valve shafts subtend an angle of approximately seventy degrees, and wherein said power rotor and said compression rotor are fixed on said power shaft in a corresponding angular relation and wherein said firing bores and fuel passage means are located approximately in said vertical plane.

3. An engine as recited in claim 1 wherein said pistons on said compression rotor uncover said fuel passages at the high point of the fuel compression stroke of said rotor whereby compressed fuel charges are delivered through said passages into said fuel charge ignition bores, and wherein said power rotor pistons overlie and close said bores while the latter are receiving said fuel charges and then uncover said bores at the start of poewr strokes on opposite sides of said power rotor in said power cylinder chamber, and wherein said compression rotor pistons cover said fuels passages during said power strokes, thereby preventing back firing, and wherein said power rotor pistons cover said exhaust ports during said power strokes of said power rotor and uncover said exhaust ports to exhaust therethrough the gases of combustion produced in said power strokes as the torque produced by the latter declines, and wherein said suction-compression rotor pistons uncover said fuel intake ports at the start of suction strokes on opposite sides of said rotor and cover said intake ports at the start of compression strokes by said rotor.

* * * * *